United States Patent [19]

Skarbo et al.

[11] 3,950,488

[45] Apr. 13, 1976

[54] PROCESS FOR RECOVERING COPPER FROM BASIC CARBONATE MIXTURES

[75] Inventors: Roald R. Skarbo, Lokken Verk, Norway; David L. Natwig, Brighton, Mass.

[73] Assignee: Kennecott Copper Corporation, New York, N.Y.

[22] Filed: Nov. 4, 1974

[21] Appl. No.: 520,673

[52] U.S. Cl. .................... 423/24; 423/27; 423/53; 423/150; 75/101 BE; 75/117; 204/106; 204/112
[51] Int. Cl.² C01G 3/00; C01G 53/00; C01G 39/00
[58] Field of Search ........... 423/24, 27, 35, 53, 150, 423/54, 139; 75/101 BE, 117

[56] References Cited
UNITED STATES PATENTS
3,193,381  7/1965  George et al. ..................... 423/139
FOREIGN PATENTS OR APPLICATIONS
959,813  6/1964  United Kingdom ................ 423/139
33,439  8/1972  Japan .................................. 423/24
1,512,813  2/1967  France ............................ 75/101 BE OTHER PUBLICATIONS
Madigan, "The Extraction of Certain Cations From Aqueous Solution With Di-(2-ethylhexyl)orthophosphate," Australian J. Chem., Vol. 13, No. 1, Feb. 1960, pp. 58–66.

*Primary Examiner*—Oscar R. Vertiz
*Assistant Examiner*—Brian E. Hearn
*Attorney, Agent, or Firm*—John L. Sniado; Lowell H. McCarter; Anthony M. Lorusso

[57] ABSTRACT

Method for treating basic salts to preferentially extract copper without using a base to maintain the required pH. The liberation of unreacted hydrogen ions during the ion exchange reaction is eliminated by partially dissolving the basic salt mixture with an amount of acid that is equivalent to the non-copper content of the basic mixture. An amount of organic ion exchange extractant is selected so that the exchangeable hydrogen ion on the extractant is equivalent to or in excess of the amount of copper in the metal bearing liquor.

27 Claims, 3 Drawing Figures

3,950,488

PROCESS FOR RECOVERING COPPER FROM BASIC CARBONATE MIXTURES

BACKGROUND OF THE INVENTION

This invention relates to a method for recovering copper, nickel and other base metal values from a basic carbonate or hydroxide mixture of such metals. In order to recover or separate metal values from basic carbonate or basic hydroxide mixtures, they are normally dissolved to produce an aqueous metal bearing solution containing the various base metals. From thes solutions metal values can be recovered or separated from each other by various schemes.

In acid solutions, liquid ion exchangers can be used effectively for separation of copper from elements such as nickel and cobalt. However, effective separation from acid systems normally requires that the pH of the system be maintained within a specific narrow range. Due to the liberation of hydrogen ions during the exchange reaction, a neutralizing agent is required for pH control. Liquid ion exchange processes in acid media are thus normally associated with formation of undesirable by-products.

SUMMARY OF THE INVENTION

In accordance with the present invention, the liberation of unreacted hydrogen ions during the ion exchange reaction is eliminated by partially dissolving the basic salt mixture with an amount of acid that is equivalent to the non-copper metal content (i.e. nickel content) of the basic carbonate or basic hydroxide mixture. An amount of organic ion exchange extractant is selected so that the exchangeable hydrogen ion on the extractant is equivalent to or in excess of the amount required to extract all the copper in the metal bearing liquor. By controlling the amount of acid used to dissolve the salt and by supplying sufficient extractant used to extract copper in accordance with the foregoing relationship, the pH of the metal bearing liquor remains fairly constant because the hydrogen ion in the organic when liberated supplements the acid and reacts with undissolved carbonates or hydroxides to place these undissolved hydroxides or carbonates into solutions.

One important advantage of the process of the present invention is that inexpensive extractants, such as carboxylic acids, which are selective for copper at a comparatively narrow pH range can be employed economically because the metal bearing solution can be adjusted to have a final pH within the appropriate range and once adjusted the pH of the metal bearing solution will not vary significantly.

Accordingly, it is an object of the present invention to provide a process for recovering base metal values from a solution with a hydrogen cation exchanger which is selective for copper at a characteristic pH range without the need to utilize a pH adjusting neutralizing agent.

DESCRIPTION OF THE PREFERRED EMBODIMENTS

There are many sources of basic metal carbonate mixtures and basic hydroxide mixtures from which copper and other base metals can be recovered. For example, in U.S. patent application Ser. No. 475,991 entitled "Metal Carbonate Recycle to Reduction Circuit in the Cuprion Process" by Lester J. Szabo filed June 3, 1974, the teachings of which are incorporated herein by reference, a source of a basic carbonate mixture is disclosed. The process disclosed in that application is an improvement in the process disclosed in U.S. patent application Ser. No. 311,063 entitled "Recovery of Metal Values from Manganese Deep Sea Nodules" filed Dec. 1, 1972, the teachings of which are also incorporated herein by reference.

In patent application Ser. No. 311,063, a process is disclosed in which copper, nickel, cobalt and molybedenum are recovered from raw manganese nodules with an aqueous ammoniacal leach solution containing cuprous ions. In that process (which has come to be called the "cuprion process") ground manganese nodules are contacted with an ammoniacal leach solution containing cuprous ions in a reaction vessel to reduce the manganese oxides in the nodules to enable metal values such as copper, nickel, cobalt and molybdenum to be solubilized. The nodule residue is washed with an ammoniacal ammonium carbonate solution to remove these entrained metal values from the residue. The reduction liquor is recycled to the reaction vessel in which the manganese nodules are added. To maintain a sufficient amount of cuprous ions, a reducing gas, such as carbon monoxide, is passed through the reaction vessels.

In the process disclosed in patent application Ser. No. 475,991 a small stream of basic metal carbonates (BMC) is recycled to the first stage as required to maintain the total copper in the system at an acceptable level. This stream of basic metal carbonate compensates for unsolubilized copper leaving the reduction loop in the clarifier underflow. To produce a stream of basic metal carbonates, a portion of the pregnant liquor (wash effluent) from the oxidation and wash-leach circuit is steam stripped on a batch basis to remove ammonia and carbon dioxide and to precipitate the basic metal carbonates. That basic carbonate mixture can be treated in accordance with the present invention to recover copper and other base metals (i.e. nickel, cobalt and molybdenum).

Figure 1:
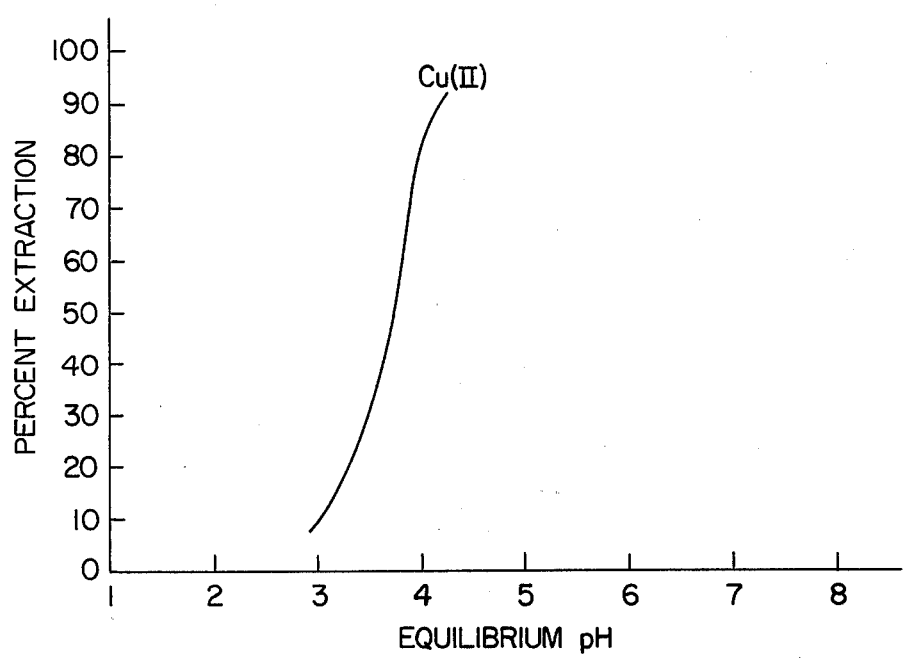
FIG. 1. is a graph showing percent extraction of copper values with naphthenic acid against the pH, FIG. 2. is a flow chart illustrating the recovery of copper and nickel from a basic carbonate mixture in accordance with the present invention, and FIG. 3. is a flow chart illustrating a process for recovering copper in which a carboxylic acid is the ion exchanger.

At the outset the process of the present invention is described in its broadest overall aspects with a more detailed description following. In order to process the basic salt, the salt must be solubilized. One typical method for solubilizing the basic salt is to dissolve them in acids such as sulfuric acid to yield an aqueous solution containing metal sulfates. From that solution, the various metals can be separated. One widely employed method for separating metals is to employ extractants which are selective for a particular metal of interest. Obviously it is desirable to use an extractant that is inexpensive. One particular extractant that is inexpensive and which has the capability of separating copper from a solution of copper and nickel and other base metals is a carboxylic acid extractant. However, as is shown in FIG. 1, carboxylic acid extractants are selective for copper at a very narrow pH range. That range is 3 to 4.2. Furthermore, since the carboxylic acid is a hydrogen cation exchanger, hydrogen ions are liberated during the extraction reaction which must be neutralized in order to maintain a constant pH during the extraction.

In accordance with the present invention, the amount of acid utilized to dissolve the salt is equivalent to the non-copper carbonate (or hydroxide) content of the salt mixture. In addition, enough extractant is supplied to extract the amount of copper in the solution. By maintaining the foregoing relations the pH of the metal bearing solution remains constant.

At this point it should be noted that the problem of hydrogen ion liberation is one that is not peculiar to carboxylic acid. Indeed, all hydrogen cation exchangers liberate hydrogen ions in acid systems. Thus, the process of the present invention can be used to great advantage with oxime extractants and organo phosphoric acid compounds.

The carboxylic acid compounds which are usable include, by way of example and not by way of limitation, naphthenic acid, pelargonic acid, 2,2-dimethyl propionic acid, capric acid, butyric acid and 3,5-dinitro benzoic acid.

The organo phosphorous compounds which can be utilized include acid compounds of the following formula:

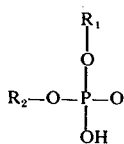

where $R_1$ and $R_2$ are selected from the group consisting of alkyl, aryl, and aralkyl radicals. Since the compound must be substantially water-immiscible, the total number of carbon atoms in the molecule should be sufficient to render the compound substantially insoluble. Generally at least 4–20 carbon atoms should be present on each R group. $R_1$ and $R_2$ can be the same radical. The $R_1$ and $R_2$ groups can, of course, be substituted with a variety of groups such as alkoxy, halogen, etc., and $R_1$ and $R_2$ can be saturated or unsaturated or interrupted by hetero atoms so long as there is no interference in the performance of the compound in extracting ions from the aqueous phase to the organic phase.

Organophosphoric acid compounds which can be advantageously used according to this invention include di(2-ethylhexyl) phosphoric acid, heptadecylphosphoric acid, dodecylphosphoric acid, di(1-methylheptyl) phosphoric acid, diiooctylphosphoric acid, di(2-ethyl-4-methyl-pentyl) phosphoric acid, di(2-propyl-4-methyl-pentyl) phosphoric acid, octylphenyl phosphoric acid, the isooctyl or stearyl derivatives of alkyl acid phosphates and the like.

The oximes referred to herein may be for example α-hydroxy oximes, substituted hydroxy benzophenoximes, and mixtures thereof.

The α-hydroxy oxime component has the general formula

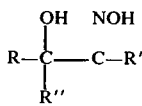

where R, R' and R'' may be any of a variety of organic hydrocarbon radicals such as aliphatic and alkylaryl radicals. R'' may also be hydrogen. Preferably, R and R' are unsaturated hydrocarbon or branched chain alkyl groups, containing from about 6 to 20 carbon atoms, R and R' are also preferably the same and, when alkyl, are preferably attached to the carbons substituted with the —OH and =NOH groups through a secondary carbon atom. It is also preferred that R'' is hydrogen or unsaturated hydrocarbon or branched chain alkyl groups containing from about 6 to 20 carbon atoms. The α-hydroxy oximes also preferably contain a total of about 14 to 40 carbon atoms. Representative compounds are 19-hydroxyhexatriaconta-9, 27-dien-18-oxime, 5-10-diethyl-8-hydroxy-tetradecan-7-oxime, and 5, 8-diethyly-7-hydroxy-dodecane-6-oxime. The latter compound has the following structural formula:

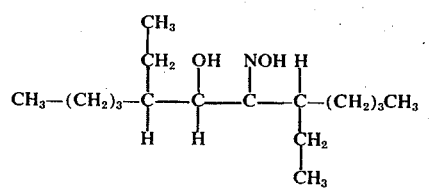

Representative of other mono- and polyunsaturated radicals are heptenyl, octenyl, decenyl, octadencenyl, and alkyl substituted radicals such as ethyloctadecenyl. Representative of other mono- and polyalkyl substituted saturated radicals are ethylhexyl, diethylheptyl, butyldecyl, butylhexadecyl, ethylbutyldodecyl, butylcyclohexyl and the like.

The α-hydroxy oxime component is also characterized as having a solubility of at least 2% by weight in the hydrocarbon solvent used to make up the organic phase and substantially complete insolubility in water.

The α-hydroxy oximes are prepared by reacting an acyloin with a hydroxylamine salt under reflux conditions. Such reaction can be carried out by refluxing the reactants in an alcohol such as ethanol and adding pyridine to combine with the acid associated with the hydroxylamine.

The substituted benzophenoximes useful in the present invention have the following formula:

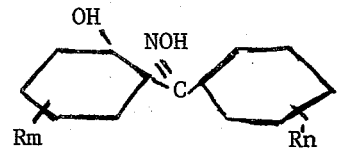

in which R and R' may be individually alike or different and are saturated aliphatic groups, ethylenically unsaturated aliphatic groups or saturated or ethylenically unsaturated aliphatic ether groups (i.e. — OR'') and $m$ and $n$ are 0, 1, 2, 3 or 4 with the provise that $m$ and $n$ are not both 0. The total number of carbon atoms in $R_m$ and $R'_n$ is from 3–25. R and R' contain 1 to 25 carbon atoms when saturated aliphatic and 3 to 25 carbon atoms when they are ethylenically unsaturated groups. Preferably, the position ortho to the phenolic OH substituted carbon atom is unsubstituted and also preferably the positions ortho to the oxime carbon atom on the other aromatic nucleus are unsubstituted. Branched chain saturated aliphatic hydrocarbon substituents are preferred. Compounds of the above type useful in the present invention include the following:

2-hydroxy-3'methyl-5-ethylbenzophenoxime
2-hydroxy-5-(1,1-dimethylpropyl)-benzophenoxime
2-hydroxy-5-(1,1-dimethylethyl) benzophenoxime
2-hydroxy-5-octylbenzophenoxime
2-hydroxy-5-nonly-benzophenoxime
2-hydroxy-5-dodecyl-benzophenoxime
2-hydroxy-2'-4'-dimethyl-5-octylbenzophenoxime
2-hydroxy-2',3',5'-trimethyl-5-octylbenzophenoxime
2-hydroxy-3,5-dinonylbenzophenoxime
2-hydroxy-4'-(1,1-dimethylethyl)-5-(2-pentyly)-benxophenoxime
2-hydroxy-4'-(1,1-diemthylethyl)-5-(2-butyl)-benzophenoxime
2-hydroxy-4-dodecyloxybenzophenoxime
2-hydroxy-4'-(1,1-dimethylethyl)-5-methylbenzophenoxime
2-hydroxy-4',5-bis-(1,1-dimethylethyl) benzophenoxime It has been found that when the α-hydroxy aliphatic oximes are employed in combination with the 2-hydroxy benzophenoximes described the extractions are improved.

The α-hydroxy aliphatic oxime extractions which may be used for this purpose have the following general formula:

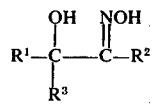

where $R^1$, $R^2$ and $R^3$ may be any of a variety of organic radicals such as aliphatic and alkylarly radicals. $R^3$ may also be hydrogen. Preferably, $R^1$ and $R^2$ are unsaturated hydrocarbon or branched chain alkyl groups containing from about 6 to 20 carbon atoms. $R^1$ and $R^2$ are also preferably the same and when alkyl are preferably attached to the carbons substituted with the —OH and =NOH groups through a secondary carbon atom. It is also preferred that $R^3$ is hydrogen or unsaturated hydrocarbon or branched chain alkyl groups containing from about 6 to 20 carbon atoms. The α-hydroxy oximes also preferably contain a total of about 14 to 40 carbon atoms. Representative compounds are 19-hydroxyhexatriaconta-9, 27-dien-18-oxime, 5,10-diethyl-8-hydroxy-tetradecan 7-oxime, and 5,8--diethyl-7-hydroxydodecane-6-oxime. The latter compound has the following formula:

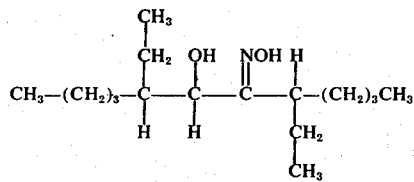

Representative of other mono-polyunsaturated radicals are heptenyl, octenyl, decenyl, octadenenyl, octadecynyl and alkyl substituted radicals such as ethyloctadecenyl. Representative of other mono- and poly-alkyl substituted saturated radicals are ethylhexyl, diethylheptyl, butyldecyl, butylhexadecyl, ethylbutyldodecyl, butylecyclohexyl and the like. The $R^1$, $R^2$ and $R^3$ groups may contain inert substituents.

These and other suitable oximes are disclosed for example by U.S. Pat. Nos. 3,224,873, 3,592,775, 3,455,680, 3,428,499, 3,276,863 and 3,197,274. Particularly suitable extractants comprise 2-hydroxy-4-nonyl-benzophenoxime which is the primary extractant in a composition also containing an α-hydroxy oxime sold by General Mills, Inc. under the tradename LIX-64N, 5,8-diethyl-7-hydroxy-6-dodecanone oxime which is the primary extractant in a composition sold by General Mills, Inc. under the tradename LIX-63 and 2-hydroxy-4-dodecylbenzophenoxime which is the primary extractant in a composition also containing an α-hydroxy oxime sold by General Mills, Inc. under the tradename LIX-64.

The ion extractants used in the practice of the present invention may be employed in an inert diluent, although the use of such diluent is not critical.

A wide varity of organic diluents, in which the ion extractant is dissolved, can be employed according to this invention. The minimum requirements for the diluent, however, are that the diluent be substantially water-immiscible, that it will dissolve the ion extractant, and that it will not interfere with the function of the ion extractant in extracting values from said acid solutions. These diluents can be aliphatic or aromatic hydrocarbons, halogenated hydrocarbons, petroleum derivatives, ethers, etc. Examples of these various diluents include toluene, carbon tetrachloride, benzene, chloroform, 2-ethyl-hexanol, and particularly kerosene.

In the prior art processes, an amount of acid is used to completely dissolve the metal values in the mixed basic salt. For example, if a basic carbonate salt containing copper and nickel carbonates was to be treated, a stoichiometric amount of acid would be used to place all the copper and all the nickel values into solution. Thus, the mixed salt is dissolved in accordance with the following reaction:

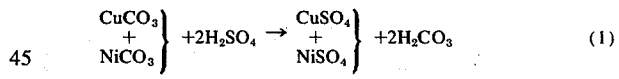  (1)

Once in solution, the soluble copper sulfate is then reacted with a hydrogen cation exchanger in accordance with the following reaction:

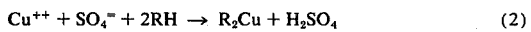  (2)

The $H_2SO_4$ which is produced in accordance with equation (2) causes the pH to drop. If the pH drops to a value below which the extractant is no long capable of extracting copper, a base must be added to the system to bring the pH of the metal bearing liquor back to a value where the extractant is selective for copper.

The chemistry of the process of the present invention differs from prior arts processes in that the equivalent amount of acid used for dissolution of the carbonates (and hydroxides) is provided by two different sources, namely:

a. Free acid introduced into the aqueous feed stream,
b. Acid generated by the exchange reaction

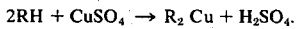

The amount of free acid introduced is adjusted to be equivalent to the amount of metals other than copper present in the basic salt mixture. The amount of acid provided by the exchange reaction (b) will be equivalent to the amount of copper present. The process will thus provide complete dissolution of the carbonates (or hydroxides) and simultaneous extraction of copper into the organic phase. The pH during the copper extraction step remains constant due to the high transfer rate of copper into the organic phase. The process of the present invention is illustrated further by the following equations:

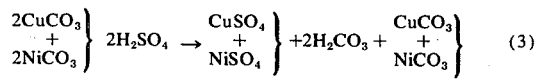  (3)

As can be seen from equation (3), when an amount of acid is selected that is equivalent to the molar amount of basic salt other than copper salts, the acid dissolves some amounts of each salt leaving some of each salt undissolved. The resulting slurry will have a pH near neutrality. When contacted with an extractant, however, the dissolved Cu and Ni are extracted. The associated pH drop will cause Ni to be stripped off again. An equilibrium pH will be obtained and will be automatically controlled within the specific extracting range for Cu only by the countering rates of the two reactions:
1. the faster exchange reaction which gives off hydrogen ions causing a pH drop, and
2. the slower dissolution of basic metal salts which consumes hydrogen ions causing a pH rise.

If an exactly equivalent amount of acid is supplied, the resulting acid solution will have a pH near neutrality. Therefore, a slight excess of acid must be added initially to result in a final aqueous solution having a pH within the range required for Cu extraction. The overall result is that the copper values are reacted with the extractant as set forth in equation (2):

$$2Cu^{++} + 2SO_4^{=} + 4RH \rightarrow 2R_2Cu + 2H_2SO_4 \quad (2),$$

and the $H_2SO_4$ formed has reacted with the undissolved Cu and Ni carbonates from equation (3) in accordance with equation (1),

resulting in complete dissolution. As has been stated above, to prevent the pH from decreasing, the liberation of unreacted hydrogen ions during the ion exchange reaction is eliminated by dissolving the basic salt mixture with an amount of acid that is equivalent to the non-copper metal content of the basic mixture. An amount of organic ion exchange extractant is selected so that the exchangeable hydrogen ion on the extractant is equivalent to or in excess of that amount required to extract all the copper in the metal bearing liquor.

The present invention can be utilized to treat any basic salt mixture containing copper and other base metals so long as the basic salt mixture is soluble. For example the process can be employed to great advantage to treat carbonates and hydroxides. The net reaction for a carbonate reaction for a carbonate mixture containing one mole amount of copper carbonate to one mole amount of nickel carbonate to one mole amount of zinc carbonate is as follow:

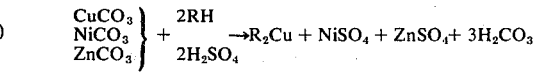

Of course, the $H_2CO_3$ decomposes to form carbon dioxide gas and water.

The net reaction for a hydroxide mixture containing 2 moles of $Ni(OH)_2$, 1 mole of $Co(OH)_2$ for every seven moles of $Cu(OH)_2$ is as follows:

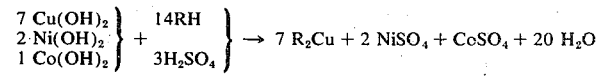

A similar result would occur if acids such as hydrochloric, nitric, phosphoric, etc. were used to dissolve the basic salt.

The invention is further illustrated by the following non-limiting examples.

EXAMPLE 1

A basic carbonate mixture containing 4.5g Cu and 4.5g Ni was suspended in 300 ml $H_2O$ contained in a 1000 ml double-walled beaker equipped with a high speed mechanical stirrer. Sulfuric acid in an amount equivalent to the nickel present in the carbonate mixture was then added to the suspension which was maintained at a temperature of 40°C. After neutralization of the acid, 450 ml LIX-64N (40 volume % in kerosene) was added to the beaker. Stirring was continued for 10 minutes. To ensure total dissolution of the carbonates, a small amount of additional acid was added to produce a final pH of 2.5. The organic and aqueous phases were allowed to separate, and samples of each phase were taken. Chemical analysis revealed the organic phase to contain 10.26 g/l Cu and 0.006 g/l Ni, and the aqueous phase to contain 11.8 g/l Ni and 0.29 g/l Cu. The aqueous phase was recontacted with fresh LIX-64N of an O/A ratio of 1. After contacting, the aqueous phase analyzed 12.0 g/l Ni and 0.0008 g/l Cu with a pH of 2.2. Thus, a two stage countercurrent process yields organic containing Cu and Ni in a ratio of about 1700 and an aqueous solution with a Ni:Cu ratio of about 15,000.

Any concentrations of Co, Zn, Mo, Mn, etc— normally found co-existing with Cu in commercial basic carbonate mixtures can be present as none of these "impurities" will extract onto LIX-64N at pH < 2.6.

EXAMPLE 2

A basic carbonate mixture containing equal amounts of Cu, Ni, Co, Zn, Mn is suspended in water in a beaker. Sulfuric acid in an amount equivalent to the Ni, Co, Zn, Mn is added to the suspension. A sufficient volume of a 1M Napthenic acid solution contacted with the slurry and a small amount of additional acid is added to produce a final pH of 4.2. The kinetics of basic carbonate dissolution at pH 4.2 is slow and therefore this particular reaction will require longer contact times and heat to speed the exchange reaction. However, after dissolution, analysis will show only Cu will have extracted leaving Zn, Ni, Co, and Mn preferentially behind in the aqueous phase. $Fe^{+++}$ will co-extract with $Cu^{++}$ if presence to any significant degree.

EXAMPLE 3

The above reaction can also be carried out using for example D2EHPA (di-2-ethyl hexylphosphoric acid). Enough additional acid will have to be added initially to produce a final pH 3.4. A drawback of this extractant is that $Zn^{++}$ as well as $Fe^{+++}$ will interfere with the preferential separation of Cu as both extract at a lower pH than 3.4.

From the foregoing, it is apparent that the object of the present process is to eliminate the necessity of supplying a pH adjusting agent such as a base when metal values are extracted by a hydrogen cation exchanger from an aqueous acidic metal bearing liquor. The necessity of including a base in the process is eliminated by preventing the pH from dropping as extraction occurs. This is accomplished by partially dissolving a basic salt mixture with an amount of acid that is equivalent to the nonextractable species (which in most cases is nickel, cobalt, etc.) and by utilizing the acid generated by the ion exchange reaction to supplement the free acid and dissolve the remainder of the basic mixture. Once an amount of acid equivalent to the nonextractable species is added, an additional amount of acid is added, if necessary, to bring the aqueous metal bearing liquor to the pH which is characteristic for the extractable species. Thereafter, the metal bearing liquor is contacted with the extractant to extract the extractable species. It should be apparent that as the extractable species is extracted, hydrogen ions are liberated which react with the undissolved carbonates to place these carbonates into solution. Thus, the pH remains essentially constant. The process is run most efficiently if an amount of extractant equivalent to or in excess of the stoichiometric amount required is used. As is apparent, however, if less than the stoichiometric amount is utilized, the invention will still be operative; but, some of the extractable species will remain in the metal bearing liquor and some of the undissolved salt will remain undissolved.

The present process is especially suitable for the removal of copper from mixtures containing other base metals. However, most extractants extract iron at the same pH as copper. Therefore, it is preferable, but not essential, to employ the process of the present invention to treat mixtures containing copper and other non-ferrous base metals.

Figure 2:
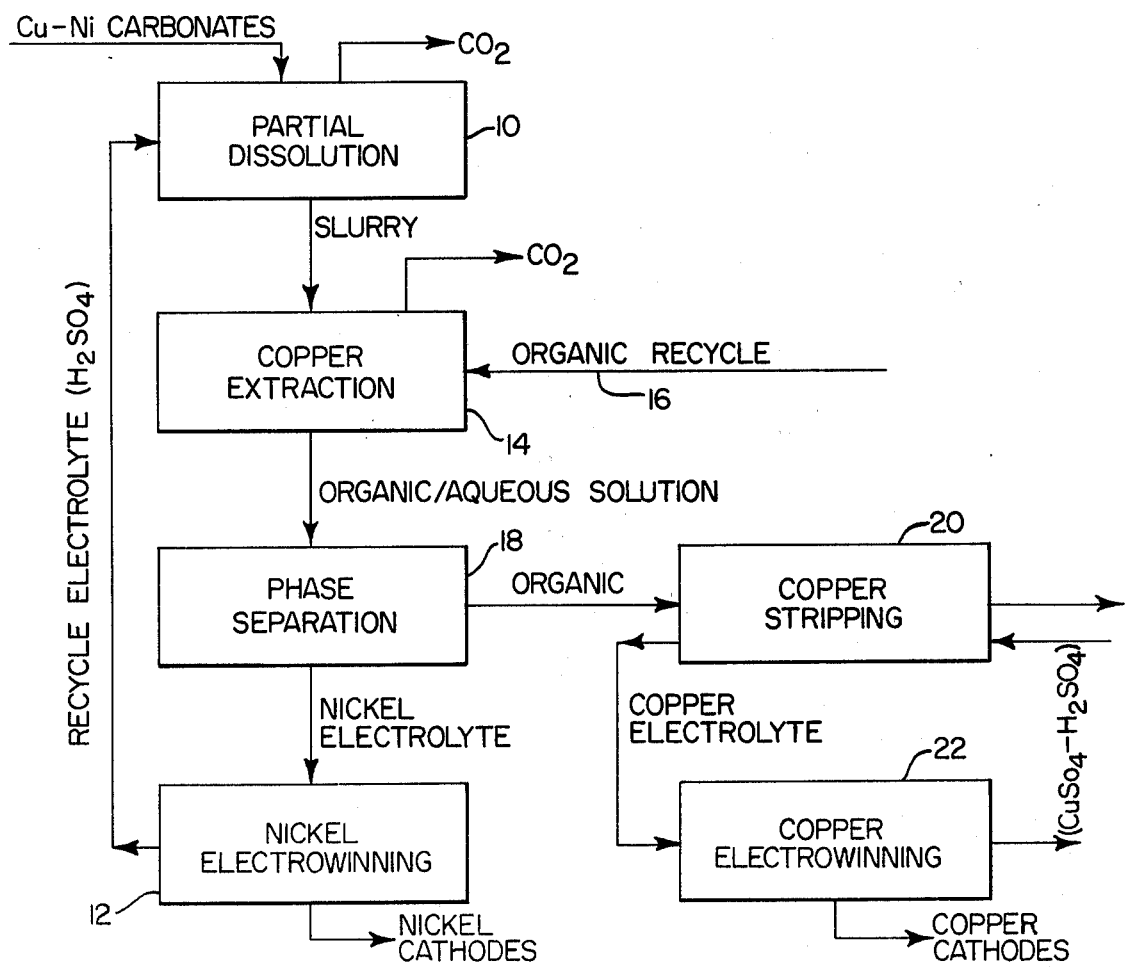
Figure 3:
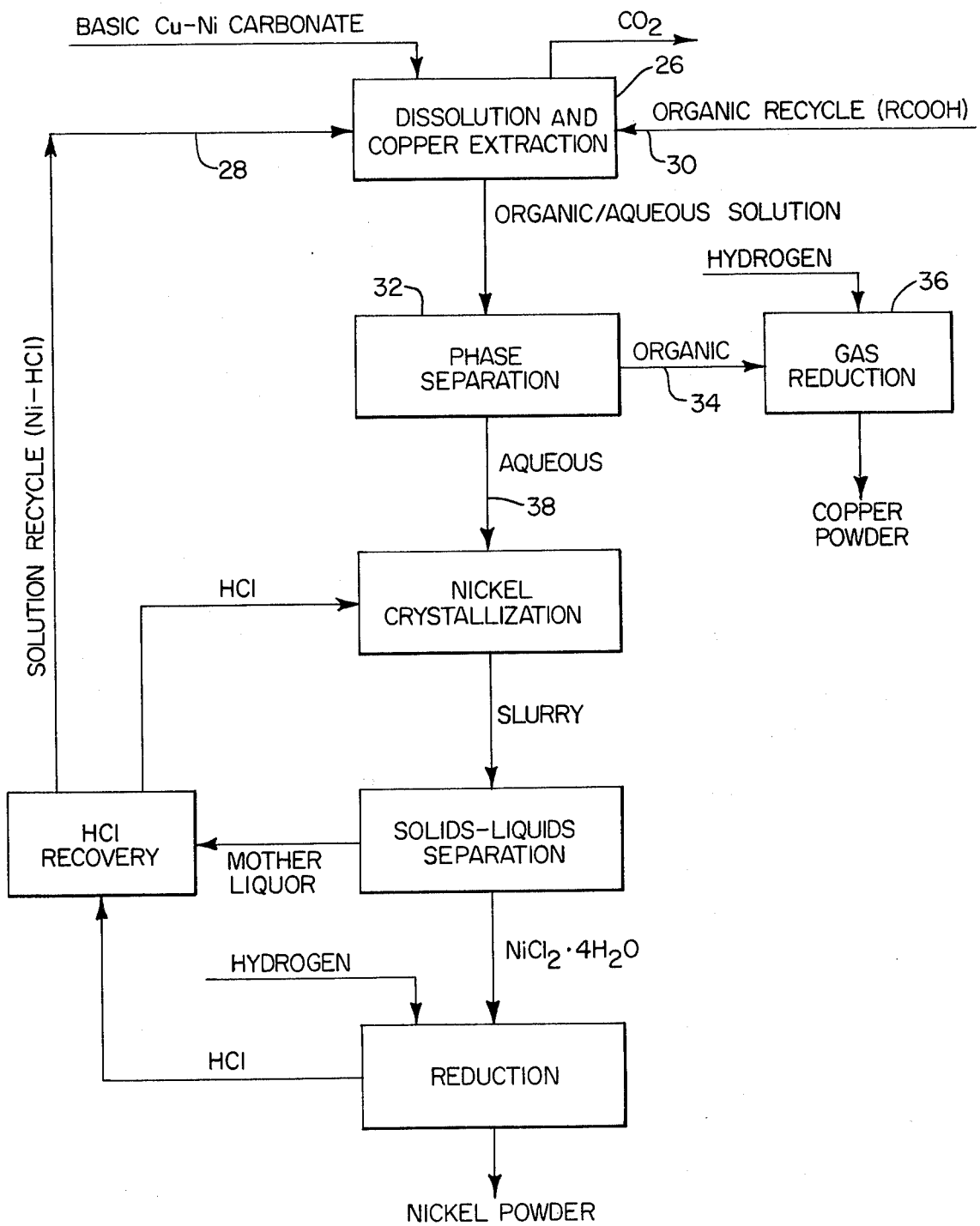

FIGS. 2 and 3 are block diagrams of a commercial application of the process of the present invention. As is shown in FIG. 2, a copper and nickel carbonate is introduced into a stage 10, whereupon, it is partially dissolved by an amount of sulfuric acid equivalent to the nickel content of the mixture. The sulfuric acid is the recycle from a nickel electrowinning circuit 12. The slurry from stage 10 is introduced into a mixer 14 where it is contacted with organic as shown by arrow 16. An amount of organic is used which is capable of extracting all of the copper present in stage 14. In stage 18, the organic is separated from the aqeuous. Of course, stage 14 and 18 can be a mixer/settler or a series of mixer/settlers connected so that there is a countercurrent flow of organic and aqueous. These details, however, are well within the skill of those in this art. The aqueous is then sent to a nickel electrowinning circuit 12 whereupon the nickel is electrowon as nickel cathodes and the electrolyte ($H_2SO_4$) is recycled to stage 10. The copper is stripped from the organic in stage 20. The stripped organic is recycled and the copper is sent to a copper electrowinning circuit 22. Details of nickel recovery and copper recovery are well within the skill of those in this art and form no part of the present invention.

An alternate embodiment of the present invention which is particularly suitable for the use of a carboxylic acid extractant is shown in FIG. 3. In this embodiment, in stage 26, recycle 28 partially dissolved the mixed carbonate while organic recycle 30 completes the carbonate dissolution. The organic/aqueous solution is separated in stage 32 and the organic 34 is sent to a gas reduction circuit 36. In the gas reduction circuit, hydrogen reduces the cupric ions to copper powder. The hydrogen ions thus produced react with the carboxylic radical to produce fresh carboxylic acid recycle 30. The aqueous 28 from stage 32 is sent to nickel reduction circuit where nickel is recovered. Details of recovery of nickel by reduction are well known in this art and also constitute no part of this invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. In a process for separating copper values from a basic salt containing copper and other non-ferrous base metal values in which the salt is dissolved in an acid and the solubilized copper is reacted with a hydrogen cation exchanger which is selective for copper at a particular pH wherein the improvement comprises partially dissolving the basic salt mixture with an amount of acid that is equivalent to the molar amount of the other base metals of the basic mixture and reacting the copper with an amount of a hydrogen cation exchanger selected so that the exchangeable hydrogen ion on the extractant is at least equivalent to the amount required to extract all the copper in the metal bearing liquor, the foregoing relationship of acid and hydrogen cation exchanger eliminating the need for the addition of a base to maintain a constant pH because the hydrogen ion in the hydrogen cation exchanger when liberated, supplements the acid and reacts with undissolved salts to place these undissolved salts into solution.

2. The process as set forth in claim 1 wherein an excess of acid over that which is equivalent to the other base metals is added to lower the pH of the dissolved basic salt mixture to the pH range which is characteristic for copper extraction for the hydrogen cation exchanger.

3. The process as set forth in claim 1 wherein the basic salt mixture is partially dissolved in sulfuric acid.

4. The process as set forth in claim 2 wherein the basic salt mixture is partially dissolved in sulfuric acid.

5. The process as set forth in claim 1 wherein the basic salt is a mixture including copper and nickel carbonate.

6. The process as set forth in claim 2 wherein the basic salt is a mixture including copper and nickel carbonate.

7. The process as set forth in claim 4 wherein the basic salt is a mixture including copper and nickel carbonate.

8. The process as set forth in claim 1 wherein the basic salt is a carbonate containing copper carbonate and the other metals include a member selected from the group consisting of nickel, cobalt, molybdenum and mixtures thereof.

9. The process as set forth in claim 2 wherein the basic salt is a carbonate containing copper carbonate and the other metals include a member selected from the group consisting of nickel, cobalt, molybdenum, and mixtures thereof.

10. The process as set forth in claim 3 where in the basic salt is a carbonate containing copper carbonate and the other metals include a member selected from the group consisting of nickel, cobalt, molybdenum, and mixtures thereof.

11. The process as set forth in claim 1 wherein the extractant is an oxime.

12. The process as set forth in claim 1 wherein the extractant is an oxime selected from the group consisting of 2-hydroxy-4-monyl-benzophenoxime, 5,8-diethyl-7-hydroxy-6-dodecanone oxime and 2-hydroxy-4-dodecyl-benxophenoxime.

13. The process as set forth in claim 2 wherein the extractant is an oxime selected from the group consisting of 2-hydroxy-4-monyl-benzophenoxime, 5,8-diethyl-7-hydroxy-6-dodecanone oxime and 2-hydroxy-4-dodecyl-benzophenoxime.

14. The process as set forth in claim 3 wherein the extractant is an oxime selected from the group consisting of 2-hydroxy-4-monyl-benzophenoxime, 5,8-diethyl-7-hydroxy-6-dodecanone oxime and 2-hydroxy-4-dodecyl-benzophenoxime.

15. The process as set forth in claim 5 wherein the extractant is an oxime selected from the group consisting of 2-hydroxy-4-monyl-benzophenoxime, 5,8-diethyl-7-hydroxy-6-dodecanone oxime and 2-hydroxy-4-dodecyl-benzophenoxime.

16. The process as set forth in claim 8 wherein the extractant is an oxime selected from the group consisting of 2-hydroxy-4-monyl-benzophenoxime, 5,8-diethyl-7-hydroxy-6-dodecanone oxime and 2-hydroxy-4-dodecyl-benzophenoxime.

17. The process as set forth in claim 1 wherein the extractant is a carboxylic acid.

18. The process as set forth in claim 1 wherein the extractant is a carboxylic acid selected from the group consisting of naphthenic acid, pelargonic acid, 2,2-dimethyl propionic acid, capric acid, butyric acid and 3,5-dinitro benzoic acid.

19. The process as set forth in claim 2 wherein the extractant is a carboxylic acid selected from the group consisting of naphthenic acid, pelargonic acid, 2,2-dimethyl propionic acid, capric acid, butyric acid and 3,5-dinitro benzoic acid.

20. The process as set forth in claim 3 wherein the extractant is a carboxylic acid selected from the group consisting of naphthenic acid, pelargonic acid, 2,2-dimethyl propionic acid, capric acid, butyric acid and 3,5-dinitro benzoic acid.

21. The process as set forth in claim 5 wherein the extractant is a carboxylic acid selected from the group consisting of naphthenic acid, pelargonic acid, 2,2-dimethyl propionic acid, capric acid, butyric acid and 3,5-dinitro benzoic acid.

22. The process as set forth in claim 8 wherein the extractant is a carboxylic acid selected from the group consisting of naphthenic acid, pelargonic acid, 2,2-dimethyl propionic acid, capric acid, butyric acid and 3,5-dinitro benzoic acid.

23. The process as set forth in claim 1 wherein the extractant is an organo phosphorous compound of the following formula:

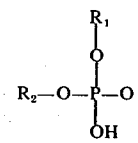

where $R_1$ and $R_2$ are selected from the group consisting of alkyl, aryl, and aralkyl radicals.

24. The process as set forth in claim 2 wherein the extractant is an organo phosphorous compound selected from the group consisting of di(2-ethylhexyl) phosphoric acid, heptadecylphosphoric acid, dodecyl-phosphoric acid, di(1-methyl-hepthl) phosphoric acid, diiooctylphosphoric acid, di(2-ethyl-4-methylpentyl) phosphoric acid, di (2-propyl-4-methyl-pentyl) phosphoric acid, and octylphenyl phosphoric acid.

25. The process as set forth in claim 3 wherein the extractant is an organo phosphorous compound selected from the group consisting of di(2-ethylhexyl) phosphoric acid, heptadecylphosphoric acid, dodecyl-phosphoric acid, di(1-methylheptyl) phosphoric acid, diiooctylphosphoric acid, di(2-ethyl-4-methyl-pentyl) phosphoric acid, di(2-propyl-4-methyl pentyl) phosphoric acid and octylphenyl phosphoric acid.

26. The process as set forth in claim 5 wherein the extractant is an organo phosphorous compound selected from the group consisting of di(2-ethylhexyl) phosphoric acid, heptadecylphosphoric acid, di(1-methyl-heptyl) phosphoric acid, diiooctylphosphoric acid, di(2-ethyl-4-methyl-pentyl) phosphoric acid, di(2-propyl-4-methyl-pentyl) phosphoric acid, and octyphenyl phosphoric acid.

27. The process as set forth in claim 2 wherein the extractant is an organo phosphorous compound selected from the group consisting of di(2 ethylhexyl) phosphoric acid, heptadecylphosphoric acid, dodecyl-phosphoric acid, di(1-methylheptyl) phosphoric acid, diiooctylphosphoric acid, di(2-ethyl-4-methyl-pentyl) phosphoric acid, di(2-propyl-4-methyl-pentyl) phosphoric acid, and octylphenyl phosphoric acid.

* * * * *